United States Patent
Lee

(10) Patent No.: US 10,897,172 B2
(45) Date of Patent: Jan. 19, 2021

(54) STATOR FOR COMPRESSOR MOTOR

(71) Applicant: LG ELECTRONICS INC., Seoul (KR)

(72) Inventor: Taegeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 16/397,207

(22) Filed: Apr. 29, 2019

(65) Prior Publication Data

US 2019/0341824 A1 Nov. 7, 2019

(30) Foreign Application Priority Data

May 4, 2018 (KR) .................. 10-2018-0051898

(51) Int. Cl.
| | |
|---|---|
| *H02K 3/30* | (2006.01) |
| *H02K 3/32* | (2006.01) |
| *H02K 1/14* | (2006.01) |
| *H02K 11/22* | (2016.01) |
| *H02K 3/18* | (2006.01) |
| *F04B 17/03* | (2006.01) |

(52) U.S. Cl.
CPC ............ *H02K 3/325* (2013.01); *H02K 1/146* (2013.01); *H02K 3/18* (2013.01); *H02K 3/30* (2013.01); *H02K 11/022* (2013.01); *F04B 17/03* (2013.01)

(58) Field of Classification Search
CPC .......................... H02K 3/522; H02K 2203/12
See application file for complete search history.

(56) References Cited

U.S. PATENT DOCUMENTS

| | | | | |
|---|---|---|---|---|
| 2,400,576 | A * | 5/1946 | Sigmund ............... | H02K 15/12 204/475 |
| 6,509,665 | B1 * | 1/2003 | Nishiyama ............ | H02K 3/345 310/194 |
| 6,992,417 | B1 * | 1/2006 | Yamada ................ | H02K 3/522 310/194 |
| 9,419,489 | B2 * | 8/2016 | Littlejohn ............. | H02K 3/345 |
| 2009/0267442 | A1 * | 10/2009 | Yamawaki ............ | H02K 3/522 310/215 |
| 2016/0065025 | A1 * | 3/2016 | Zhang .................. | B29C 70/688 310/215 |

FOREIGN PATENT DOCUMENTS

KR   10-2006-0027704    3/2006

\* cited by examiner

*Primary Examiner* — Dang D Le

(74) *Attorney, Agent, or Firm* — KED & Associates LLP

(57) ABSTRACT

A stator for a compressor motor may include a stator body having a hollow therein, a plurality of coil winding portions that protrudes inward from an inner circumferential surface of the stator body and spaced apart from each other, a coil wound around each of the plurality of coil winding portions, and an insulation portion that extends in an axial direction of the stator body, disposed between a first coil winding portion and a second coil winding portion of the plurality of coil winding portions, and coupled to the inner circumferential surface of the stator body to surround a portion of the coil. The insulation portion may be made of polyether ether ketone, which is a plastic-based material, or one of polyurethane rubber or silicone rubber, which are rubber-based materials.

20 Claims, 8 Drawing Sheets

STATOR FOR COMPRESSOR MOTOR

CROSS-REFERENCE TO RELATED APPLICATION(S)

The present application claims priority under 35 U.S.C. 119 and 35 U.S.C. 365 to Korean Patent Application No. 10-2018-0051898, filed in Korea on May 4, 2018, which is hereby incorporated by reference in its entirety.

BACKGROUND

1. Field

A stator for a compressor motor is disclosed herein.

2. Background

In general, compressors are machines that receive power from a power generation device, such as an electric motor or a turbine, to compress air, a refrigerant, or various working gases, thereby to increase a pressure. Compressors are being widely used in home appliances, such as refrigerators or air conditioners, or in various industrial fields.

Compressors may be largely classified into reciprocating compressors in which a compression space into and from which a working gas, such as a refrigerant, is suctioned and discharged is defined between a piston and a cylinder to allow the piston to be linearly reciprocated into the cylinder, thereby compressing the working gas, rotary compressors in which a compression space into and from which a working gas, such as a refrigerant, is suctioned or discharged is defined between a roller that eccentrically rotates and a cylinder to allow the roller to eccentrically rotate along an inner wall of the cylinder, thereby compressing the working gas, and scroll compressors in which a compression space into and from a working gas, such as a refrigerant, is suctioned or discharged is defined between an orbiting scroll and a fixed scroll to compress the working gas while the orbiting scroll rotates along the fixed scroll.

A structure of a stator used in a compressor according to related art is disclosed in Korean Patent Publication No. 10-2006-0027704, which is hereby incorporated by reference. According to the related art, disclosed are features in which an insulator is coupled to upper and lower portions of a stator, an insulation film member having a film shape is coupled to a slot, and a coil is wound around the insulator and the insulation film member.

According to the related art, the insulator and the insulation film member have limitations in reducing electromagnetic noise generated in the wound coil. Also, if a component for reducing the electromagnetic noise is additionally installed, an amount of coil capable of being wound around the stator is reduced, deteriorating drive efficiency of the compressor motor.

BRIEF DESCRIPTION OF THE DRAWINGS

Embodiments will be described in detail with reference to the following drawings in which like reference numerals refer to like elements and, wherein.

DETAILED DESCRIPTION

Figure 1:
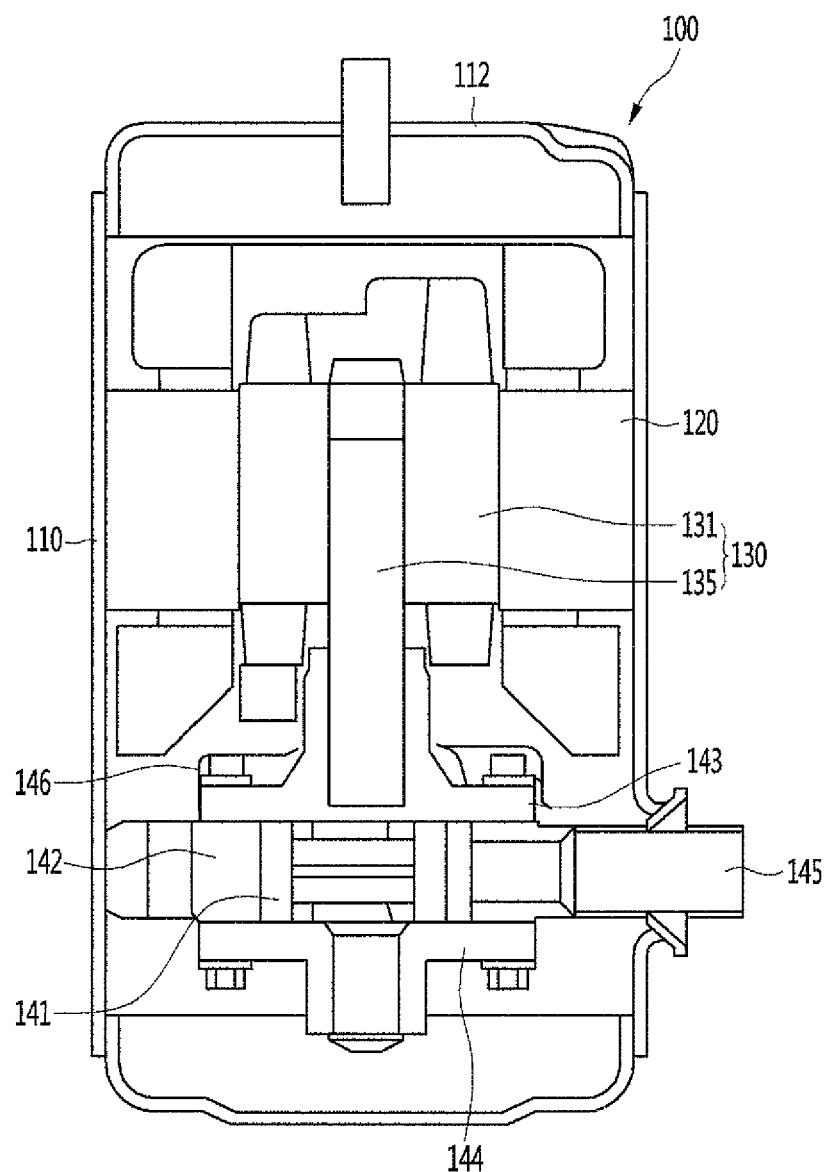
FIG. 1 is a view illustrating a configuration of a compressor according to an embodiment.

Hereinafter, embodiments will be described with reference to the accompanying drawings. It should be noted that when components in the drawings are designated by reference numerals, the same or like components have the same or like reference numerals as far as possible even though the components are illustrated in different drawings. Further, in description of embodiments, when it is determined that detailed descriptions are well-known configurations or functions reduce understanding, the detailed descriptions have been omitted.

Also, in the description of the embodiments, terms such as first, second, A, B, (a) and (b) may be used. Each of these terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Hereinafter, a compressor according to an embodiment will be described with reference to the accompanying drawings. A rotary compressor will be described as an example of the compressor.

FIG. 1 is a view illustrating a configuration of a compressor according to an embodiment. Referring to FIG. 1, a rotary compressor 100 according to an embodiment may include a case 110 defining an inner space and a top cover 112 coupled to an upper portion of the case 110.

A motor may be provided in the case 110. The motor may include a stator 120 that generates magnetic force by applied power and a compression mechanism 130 that compresses a refrigerant by induced electromotive force generated through an interaction with the stator 120.

The compression mechanism 130 may include a rotor 131 provided inside the stator 120. The stator 120 and the rotor 131 may be understood as components of the compressor motor. The compression mechanism 130 may further include a rotational shaft 135 coupled to the rotor 131 to rotate according to rotation of the rotor 131.

The rotary compressor 100 may further include a roller 141 eccentrically coupled to a lower portion of the rotational shaft 135 to rotate along a predetermined eccentric trajectory according to the rotation of the rotational shaft 135, a cylinder 142 in which the roller 141 is accommodated, and a main bearing 143 and a sub bearing 144, which may be provided on or at upper and lower portions of the cylinder 142 to support the cylinder 142. Each of the main bearing 143 and the sub bearing 144 may have an approximately disc shape. The main bearing 9 and the sub bearing 10 may support the upper and lower portions of the cylinder 142, respectively.

The rotary compressor 100 further includes a vane (not shown) that separates a suction chamber and a compression chamber while reciprocating within a slot defined in the cylinder 142 according to rotation of the roller 141, a suction hole 145 and a discharge hole, which provide a flow passage for a refrigerant suctioned into or discharged from the cylinder 142, and a muffler 146 provided on or at an upper portion of the discharge hole to reduce discharge noise of the refrigerant.

An effect due to the above-described components will be briefly described hereinafter. When the rotational shaft 135 rotates, the roller 141 may rotate and revolve along an inner circumferential surface of the cylinder 142 while drawing a predetermined eccentric trajectory. The refrigerant may be introduced into the suction chamber of the cylinder 142 through the suction hole 145. Then, the refrigerant may be compressed in a compression chamber while the roller 141 rotates.

When a pressure within the compression chamber is equal to or greater than a discharge pressure, a discharge valve (not shown) provided on or at one side of the discharge hole may be opened, and the compression refrigerant may be discharged to the discharge hole through the opened discharge valve. The discharge valve may be disposed on the main bearing 143 above the cylinder 142.

The refrigerant discharged through the discharge hole may be introduced into the muffler 146 disposed on the main bearing 143. The muffler 146 may serve to reduce noise of the discharged refrigerant.

The main bearing 143 may be disposed above the cylinder 142 to disperse compression force of the refrigerant, which is generated in the cylinder 142, or force generated in the compressor motors 120 and 131 toward the case 110.

Figure 2:
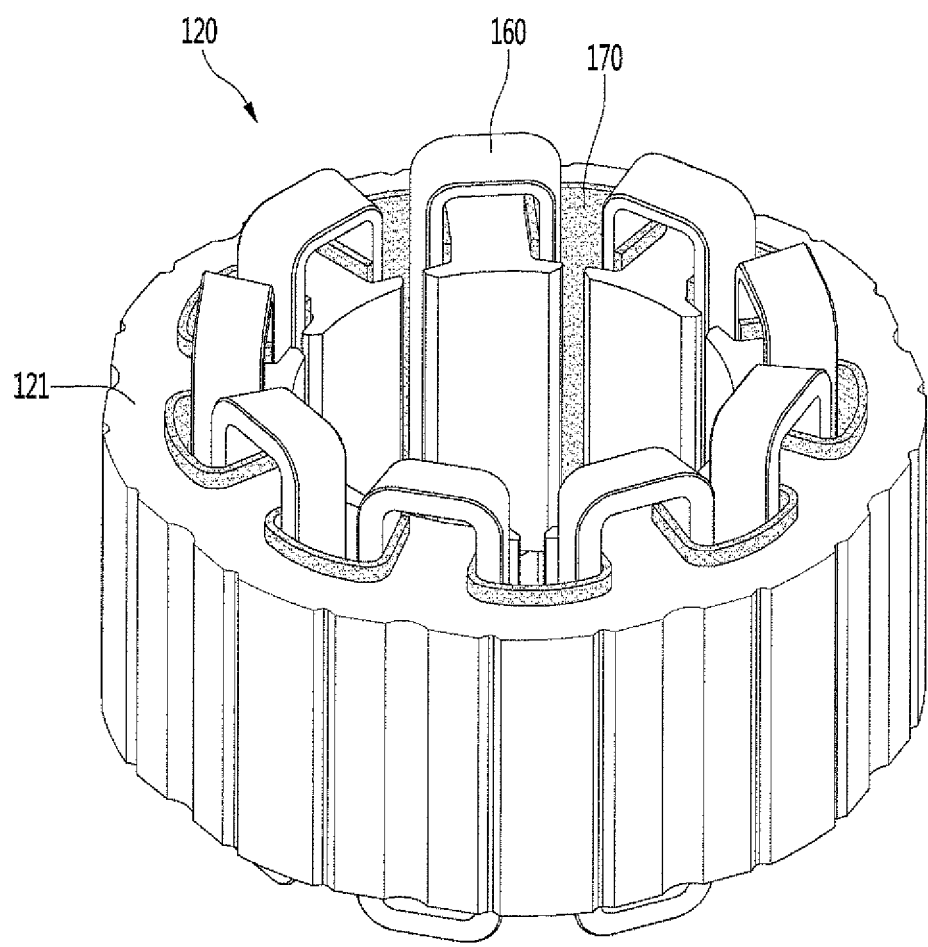
FIG. 2 is a perspective view illustrating a state in which a coil is wound around a stator according to the embodiment of FIG. 1.
Figure 3:
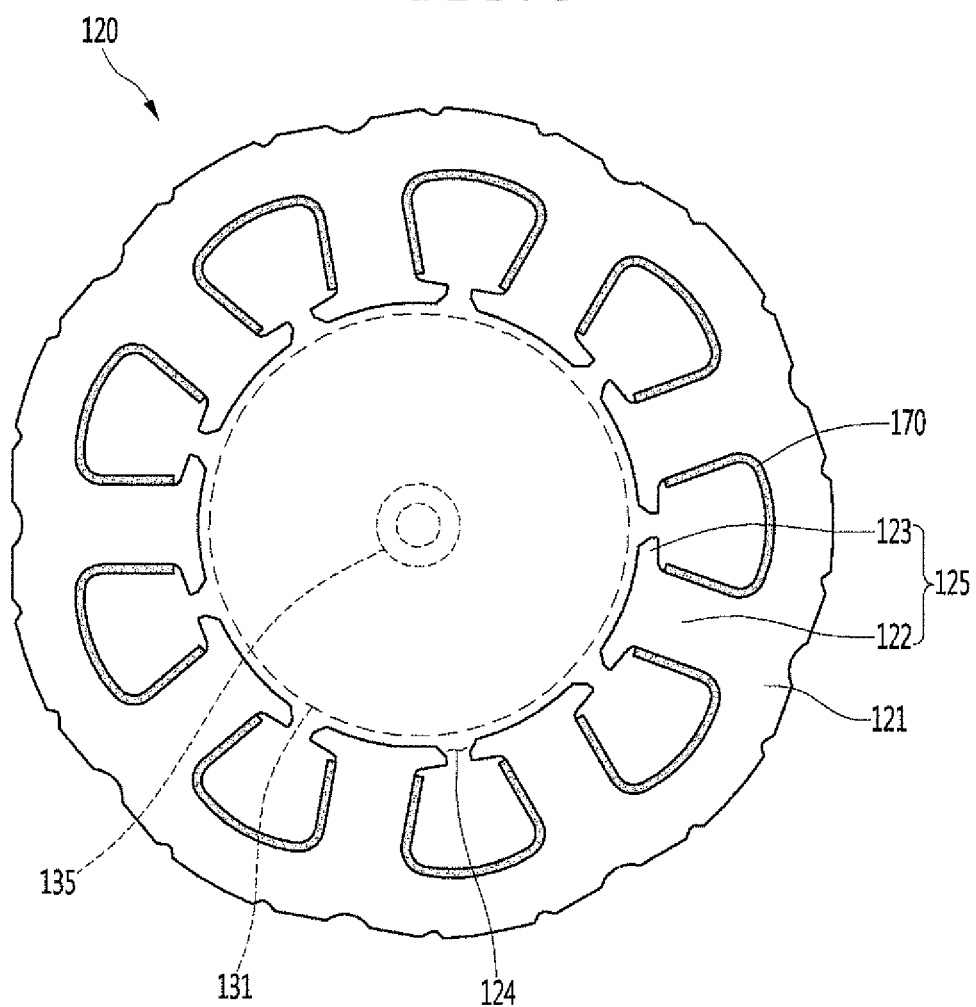
FIG. 3 is a plan view of the stator according to the embodiment of FIG. 1.
Figure 4:
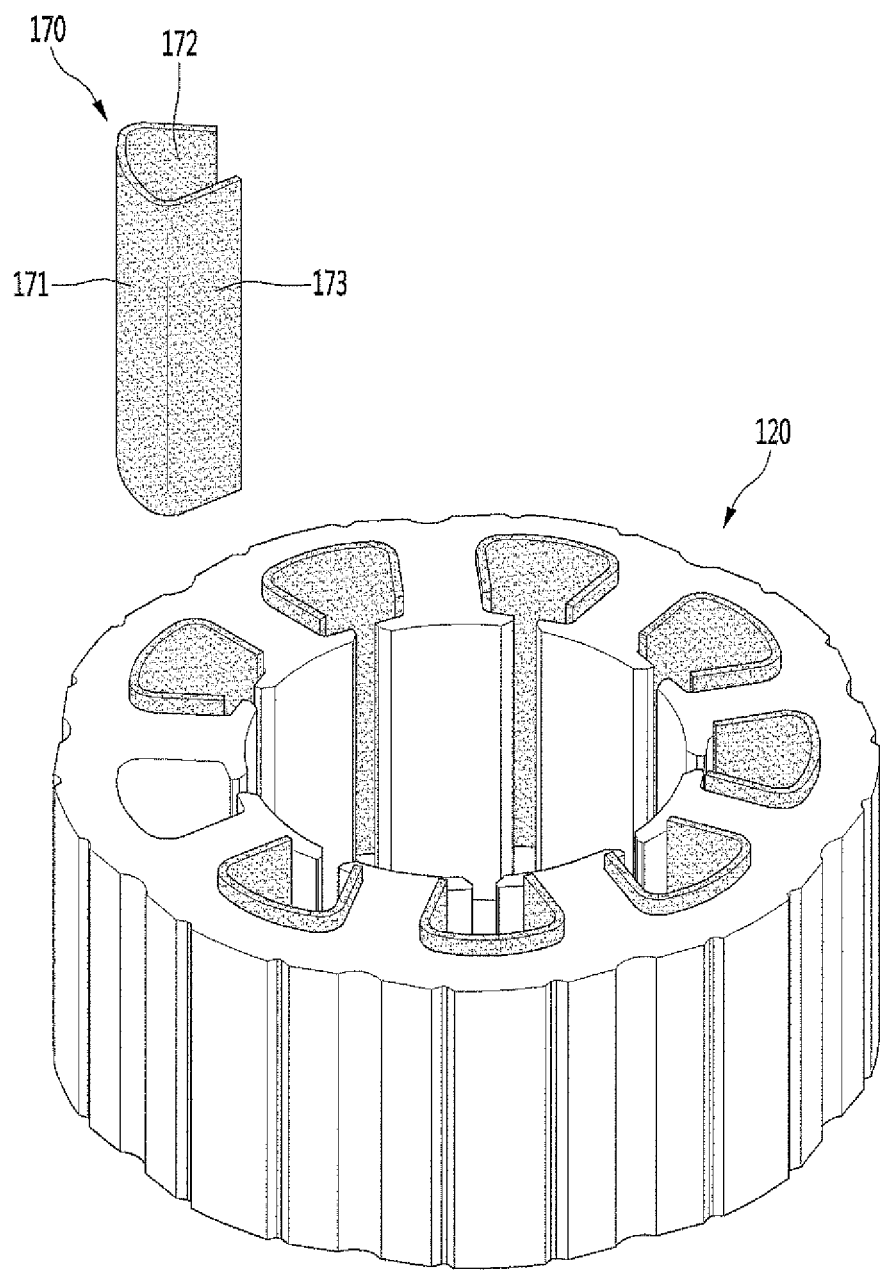
FIG. 4 is an exploded view of the stator according to the embodiment of FIG. 1.

FIG. 2 is a perspective view illustrating a state in which a coil is wound around the stator according to the embodiment of FIG. 1. FIG. 3 is a plan view of the stator according to the embodiment of FIG. 1. FIG. 4 is an exploded view of the stator according to the embodiment of FIG. 1.

Referring to FIGS. 2 to 4, the rotary compressor 100 according to this embodiment may include the case 110 (see FIG. 1) having an approximately cylindrical shape and defining the inner space, the stator 120 installed in the case 110, the rotor 131 installed to rotate in the stator 120, and the rotational shaft 135 coupled to the rotor 131 to rotate according to the rotation of the rotor 131. The stator 120 may be one component of the compressor motor and generate magnetic force by applied power. The stator 120 may include a stator body 121 having an approximately hollow cylindrical shape and a coil winding part or portion 125 protruding inward from an inner circumferential surface of the stator body 121.

The stator body 121 may be inserted into the case 110. At least a portion of an outer circumferential surface of the stator body 121 may be coupled to contact an inner circumferential surface of the case 110.

A plurality of the coil winding part 125 may be provided, and the plurality of coil winding parts 125 may be disposed to be spaced apart from each other. A coil 160 may be wound around each of the plurality of winding parts 125. At least a portion of the coil 160 may be disposed between one or a first coil winding part 125 and the other or a second coil winding part 125.

The coil winding part 125 may include a body 122 that protrudes from the inner circumferential surface of the stator body 121 toward a center and an extension part or portion 123 that extends from an end of the body 122 toward each of both sides thereof. The extension parts 123 may extend from the two coil winding parts 125 adjacent to each other, respectively. That is, two extension parts 123 respectively extending to left and right or lateral sides may be disposed on one coil winding part 125. The extension part 123 may be understood as a "separation prevention rib" that prevents the coil wound around the coil winding part 125 from being separated. An insertion space 124 into which the coil 160 may be inserted may be defined between the extension parts 123 of the two coil winding parts 125 adjacent to each other.

The stator 120 may further include an insulation part or portion or layer 170. The insulation part 170 may reduce electromagnetic noise that may be generated in the stator 120. The insulation part 170 may reduce electromagnetic noise generated when power is applied to the coil 160 to generate electromagnetic force, and the compressor motors 120 and 131 are driven by the electromagnetic force.

The insulation part 170 may be disposed between the two coil winding parts 125 adjacent to each other. Also, the insulation part 170 may be disposed on the inner circumferential surface of the stator body 121. The insulation part 170 may surround a portion of the coil 160 disposed between one or a first coil winding part 125 and the other or a second coil winding part 125.

That is, the insulation part 170 may surround a portion of the coil 160 disposed between two coil winding parts 125 adjacent to each other to reduce the electromagnetic noise generated between the coil 160 and the stator 120. The insulation part 170 may surround a portion of the coil 160 to insulate the coil 160 and the stator 120 from each other.

The insulation part 170 may be made of a plastic-based or rubber-based material, for example. Also, the insulation part 170 may be made of an insulation material, a damping material, or a vibration damper material, for example.

When the insulation part 170 is made of the plastic-based material, the insulation part 170 may be made of a material which is excellent in at least one of heat resistance, chemical resistance, abrasion resistance, or workability. For example, the insulation part 170 may be made of polyether ether ketone (PEET). Also, the insulation part 170 may be processed by a processing device and then mounted on the inner circumferential surface of the stator body 121.

When the insulation part 170 is made of the rubber-based material, the insulation part 170 may be made of a material which is excellent in at least one of durability (hardness, tensile strength, etc.), use temperature, heat resistance, and chemical resistance (acid resistance, etc.). For example, the insulation part 170 may be made of polyurethane rubber or silicone rubber. For example, the insulation part 170 may be made of liquid rubber and then applied to the inner circumferential surface of the stator body 121 and hardened so as to be fixed to the inner circumferential surface of the stator body 121. Alternatively, the insulation part 170 may be made of plate-shaped rubber and then inserted into the inner circumferential surface of the stator body 121 so as to be fixed to the inner circumferential surface of the stator body 121.

Hereinafter, a structure of the insulation part 170 will be described.

The insulation part 170 may include an insulation part body 171, a first extension part or portion 172, and a second extension part or portion 173.

The insulation part body 171 may be coupled to the inner circumferential surface of the stator body 121. The insulation part body 171 may be coupled to the inner circumferential surface of the stator body 121 disposed between one coil winding part 125 and the other coil winding part 125. Also, the insulation part body 171 may move in a vertical direction of the stator body 121 and be coupled to the inner circumferential surface of the stator body 121. The vertical direction of the stator body 121 may be understood as an axial direction of the stator body 121.

The first extension part 172 may extend from one or a first side surface of the insulation part body 171. Also, the second extension part 173 may extend from the other or a second side surface of the insulation part body 171. In this embodiment, the first extension part 172 may extend from a left side of the insulation part body 171, and the second extension part 173 may extend from a right side of the insulation part body 171.

The first extension part 172 may extend from one side of the insulation part body 171 toward the extension part 123 of one coil winding part 125. The first extension part 172 may extend from the insulation part body 171 and then be coupled to one coil winding part 125. A portion of one coil 160 wound around the adjacent coil winding part 125 may contact the first extension part 172.

The second extension part 173 may extend from the other side of the insulation part body 171 toward the extension part 123 of the other coil winding part 125. Also, the second extension part 173 may extend from the insulation part body 171 and then be coupled to the other coil winding part 125. A portion of the other coil 160 wound around the adjacent coil winding part 125 may contact the second extension part 173.

In this embodiment, when the insulation part 170 is viewed in a plane, the insulation part 170 may have an approximately 'ᄃ' shape. Thus, the insulation part 170 may be inserted between one coil winding part 125 and the other coil winding part 125 of the stator 120.

The insulation part body 171 may extend in the axial direction of the stator body 121. The insulation part body 171 that extends in the axial direction may further protrude than the stator body 121. The first extension part 172 and the second extension part 173 may extend in the axial direction of the stator body 121. The first extension part 172 and the second extension part 173, which extend in the axial direction, may further protrude than the stator body 121. That is, upper and lower ends of the insulation part 170 may further protrude than upper and lower ends of the stator body 121. The upper end of the insulation part 170 may be defined as "one protrusion portion" or a "first protrusion portion", the lower end of the insulation part 170 may be defined as "the other protrusion portion" or a "second protrusion portion", and a portion accommodated in the stator body 121 may be defined as an "internal fixing portion".

When the insulation part 170 is disposed to further protrude than the stator body 121, the coil 160 may be prevented from directly contacting the stator 120 when the coil 160 is wound around one coil winding part 125 and the other coil winding part 125. The coil 160 wound around the stator body 121 may be wound around the stator 120 in a state of being spaced apart from the upper and lower ends of the stator 120 by one protrusion portion and the other protrusion portion of the insulation part 170, which are disposed to further protrude than the stator body 121. Also, the coil 160 may be stably fixed to the stator body 121 by the internal fixing portion of the insulation part 170.

As the insulation part 170 increases in thickness, the number of turns of the coil 160 wound between one coil winding part 125 and the other coil winding part 125 may decrease. Also, as the insulation part 170 decreases in thickness, a reduction effect of the noise generated in the coil 160 may be reduced. Thus, the insulation part 170 may have a set thickness.

Due to this configuration, the insulation part 170 may be disposed between the coil winding parts 125 adjacent to each other, and the coil 160 may be wound around the insulation part 170 to reduce the electromagnetic noise, which may be generated in the coil 160, by the insulation part 170. As a portion of the coil 160 wound around the coil winding part 125 is surrounded by the insulation part 170, vibration of the electromagnetic noise generated in the coil 160 may be attenuated by the insulation part 170 to reduce the electromagnetic noise. Further, the electrical limitation that may occur due to direct contact between the coil 160 wound around the coil winding part 125 and the stator 120 may be prevented by the insulation part 170.

Figure 5:
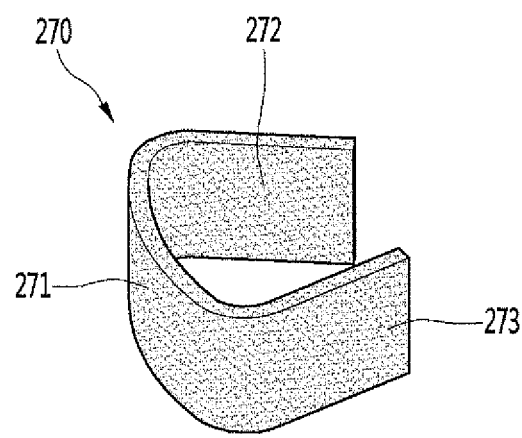
FIG. 5 is a perspective view of an insulation part according to another embodiment.
Figure 5:
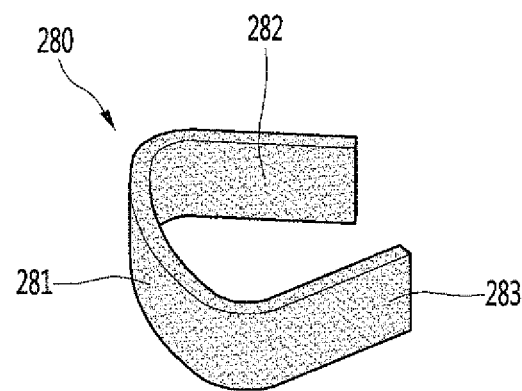

FIG. 5 is a perspective view of an insulation part according to another embodiment. An insulation part according to this embodiment has a feature in which a portion of the insulation part according to the previous embodiment is deformed. Thus, descriptions of components which are the same or similar to those according to the previous embodiment will be omitted.

Referring to FIG. 5, the insulation part according to this embodiment may include a first insulation part or portion 270 and a second insulation part or portion 280. The first insulation part 270 and the second insulation part 280 may be disposed to be spaced apart from each other. The first insulation part 270 and the second insulation part 280 may be disposed to be spaced apart from each other in a vertical direction with respect to an axial direction of a stator body. The first insulation part 270 may be disposed on an upper portion of the stator body, and the second insulation part 280 may be disposed on a lower portion of the stator body.

The first insulation part 270 may be disposed above the second insulation part 280. The first insulation part 270 may include a first insulation part body 271, a first extension part or portion 272, and a second extension part or portion 273.

The first insulation part body 271 may be coupled to an inner circumferential surface of the stator body disposed between coil winding parts adjacent to each other. The first extension part 272 may extend from one or a first side surface of the first insulation part body 271 in a direction of an extension part or portion of one or a first coil winding part or portion and then be coupled to a body of the one coil winding part. The second extension part 273 may extend from the other or a second side surface of the first insulation part body 271 in a direction of an extension part or portion of the other or a second coil winding part or portion and then be coupled to a body of the other coil winding part. The first extension part 272 may be referred to as "one side extension part" or a "first side extension portion" and the second extension part 273 may be referred to as "the other side extension part" or a "second side extension portion".

The second insulation part 280 may be disposed below the first insulation part 270. Also, the second insulation part 280 may include a second insulation part body 281, a third extension part 282, and a fourth extension part 283.

The second insulation part body 281 may be coupled to the inner circumferential surface of the stator body disposed between the coil winding parts adjacent to each other. The second extension part 282 may extend from one or a first side surface of the second insulation part body 281 in a direction of an extension part or portion of one or a first coil winding part or portion and then be coupled to a body of the one coil winding part. The fourth extension part 283 may extend from the other or a second side surface of the second insulation part body 281 in a direction of an extension part or portion of the other or a second coil winding part or portion and then be coupled to a body of the other coil winding part. The second extension part 282 may be referred to as "one side extension part" or a "first side extension portion", and the fourth extension part 283 may be referred to as "the other side extension part" or a "second side extension portion".

The first insulation part 270 may be disposed to further protrude upward than an upper end of the stator body. The second insulation part 280 may be disposed to further protrude downward than a lower end of the stator body. That is, a portion of the first insulation part 270 and a portion of the second insulation part 280 may be disposed to further protrude from than the upper and lower ends of the stator body. A remaining portion of the first insulation part 270 and a remaining portion of the second insulation part 280 may be disposed inside the stator body and then coupled to the stator body.

Due to this configuration, while the coil is wound around the stator, direct contact between the stator and the coil may be prevented by the first insulation part 270 and the second insulation part 280. Also, the insulation part coupled to the stator may be provided to be divided into the first insulation part 270 and the second insulation part 280, thereby reducing manufacturing cost required for manufacturing the insulation part. Also, since the first insulation part 270 and the second insulation part 280 are easily mounted on the stator body, the method for coupling the insulation part to the stator body may be easily performed.

Figure 6:
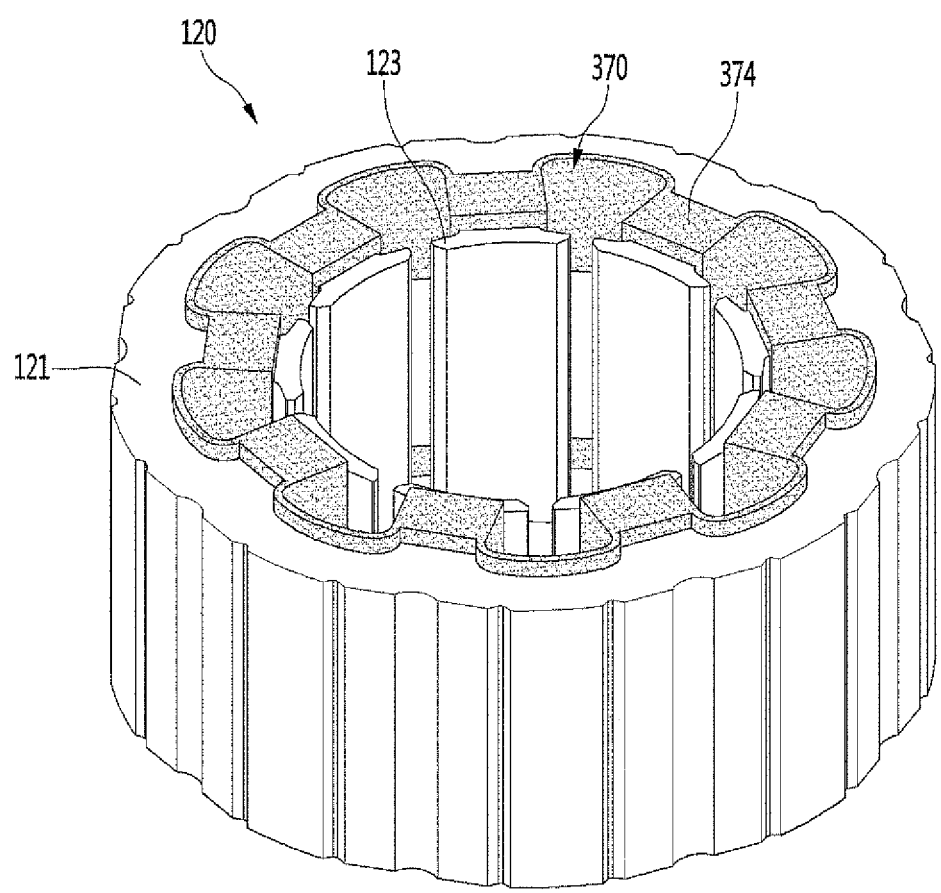
FIG. 6 is a perspective view of a stator according to another embodiment.
Figure 7:
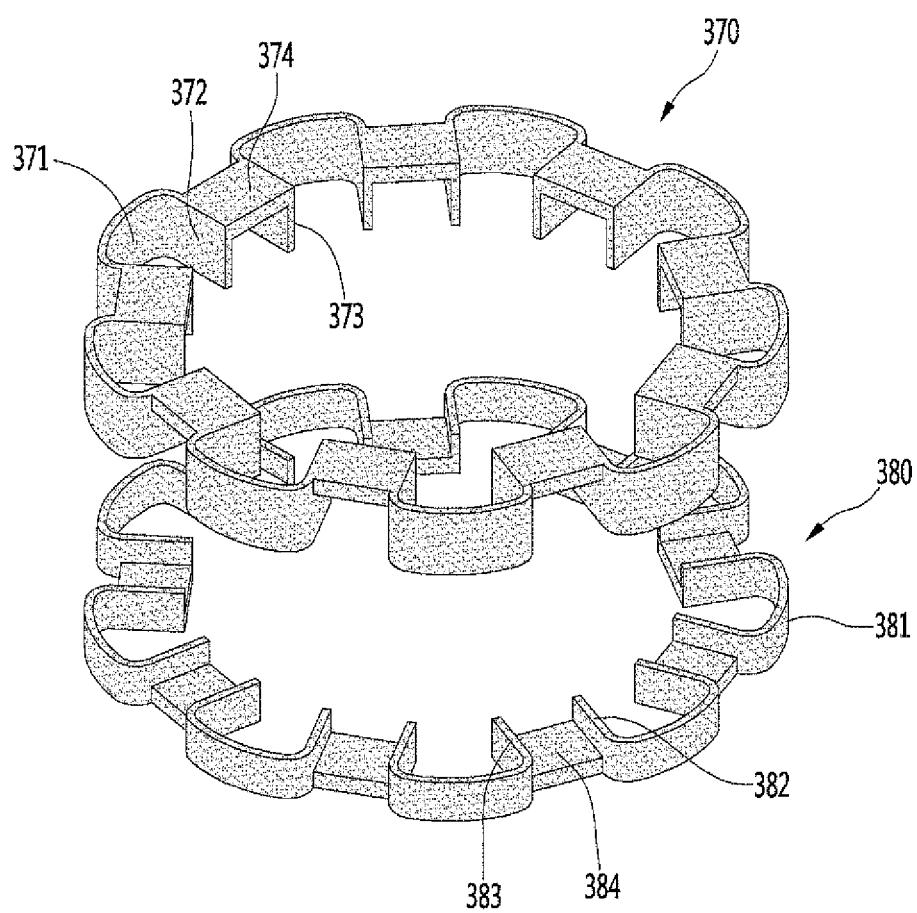
FIG. 7 is a perspective view of an insulator according to the embodiment of FIG. 6.

FIG. 6 is a perspective view of a stator according to another embodiment. FIG. 7 is a perspective view of an insulator according to the embodiment of FIG. 6.

An insulation part according to this embodiment has a feature in which a portion of the insulation part according to this embodiment is deformed. Thus, descriptions of components which are the same or similar to those according to the previous embodiment have been omitted.

Referring to FIGS. 6 and 7, stator 120 according to this embodiment may include an upper insulator 370 and a lower insulator 380. The upper insulator 370 and the lower insulator 380 may be disposed to be spaced apart from each other. The upper insulator 370 and the lower insulator 380 may be spaced apart from each other in a vertical direction with respect to an axial direction of stator body 121.

The upper insulator 370 may be disposed on an upper end of the stator body 121. Also, the upper insulator 370 may be understood as one insulation in which a plurality of insulation parts according to the previous embodiment are connected to each other.

The upper insulator 370 may include a first insulation part body 371, a first extension part or portion 372, a second extension part or portion 373, and a first connection part or portion 374.

The first insulation part body 371 may be coupled to an inner circumferential surface of the stator body 121 disposed between coil winding parts adjacent to each other. The first extension part 372 may extend from one or a first side surface of the first insulation part body 371 and then be coupled to a body of the one coil winding part. The second extension part 373 may extend from the other or a second side surface of the first insulation part body 371 and then be coupled to a body of the other coil winding part.

The first connection part 374 may form the upper insulator 370 which is integrated by connecting the first extension part 372 of the first insulation part body, which is disposed on one side, of the plurality of first insulation part bodies disposed adjacent to each other to the second extension part 373 of the first insulation part body, which is disposed at the other side. The first connection part 374 may be disposed on upper ends of the first extension part 372 and the second extension part 373 to connect the first extension part 372 to the second extension part 383.

The first connection part 374 may be seated on the stator body 121 while the upper insulator 370 is coupled to the stator body 121. That is, the first connection part 374 may be seated on the stator body 121 while the upper insulator 370 is coupled to the upper end of the stator body 121 so that a portion of the upper insulator 370 is coupled to the inside of the stator body 121, and a remaining portion of the stator body 121 is exposed to the outside.

The lower insulator 380 may be disposed on a lower end of the stator body 121. Also, the lower insulator 380 may be understood as one insulation in which a plurality of insulation parts according to the previous embodiment is connected to each other.

The lower insulator 380 may include a second insulation part body 381, a third extension part or portion 382, a fourth extension part or portion 383, and a second connection part or portion 384. The second insulation part body 381 may be coupled to an inner circumferential surface of the stator body 121 disposed between coil winding parts adjacent to each other. The third extension part 382 may extend from one or a first side surface of the second insulation part body 281 and then be coupled to a body of the one coil winding part. The fourth extension part 383 may extend from the other or a second side surface of the second insulation part body 381 and then be coupled to a body of the other coil winding part.

The second connection part 384 may form the lower insulator 380 which is integrated by connecting the third extension part 382 of the second insulation part body, which is disposed on one side, of the plurality of second insulation part bodies disposed adjacent to each other to the fourth extension part 383 of the second insulation part body, which is disposed at the other side. The second connection part 384 may be disposed on lower ends of the third extension part 382 and the fourth extension part 383 to connect the third extension part 382 to the fourth extension part 383.

The second connection part 384 may be seated on the stator body 121 while the lower insulator 380 is coupled to the stator body 121. That is, the second connection part 384 may be seated on the stator body 121 while the lower insulator 380 is coupled to the lower end of the stator body 121 so that a portion of the lower insulator 380 is coupled to the inside of the stator body 121, and a remaining portion of the stator body 121 is exposed to the outside.

Due to this configuration, the upper insulator 370 and the lower insulator, which may be integrated with each other, may be easily coupled to the stator 120. Also, the coils wound around one coil winding part and the other coil winding part may be prevented from directly contacting the upper and lower ends of the stator 120 by the first connection part 374 of the upper insulator 370 and the second connection part 384 of the lower insulator 380.

Figure 8:
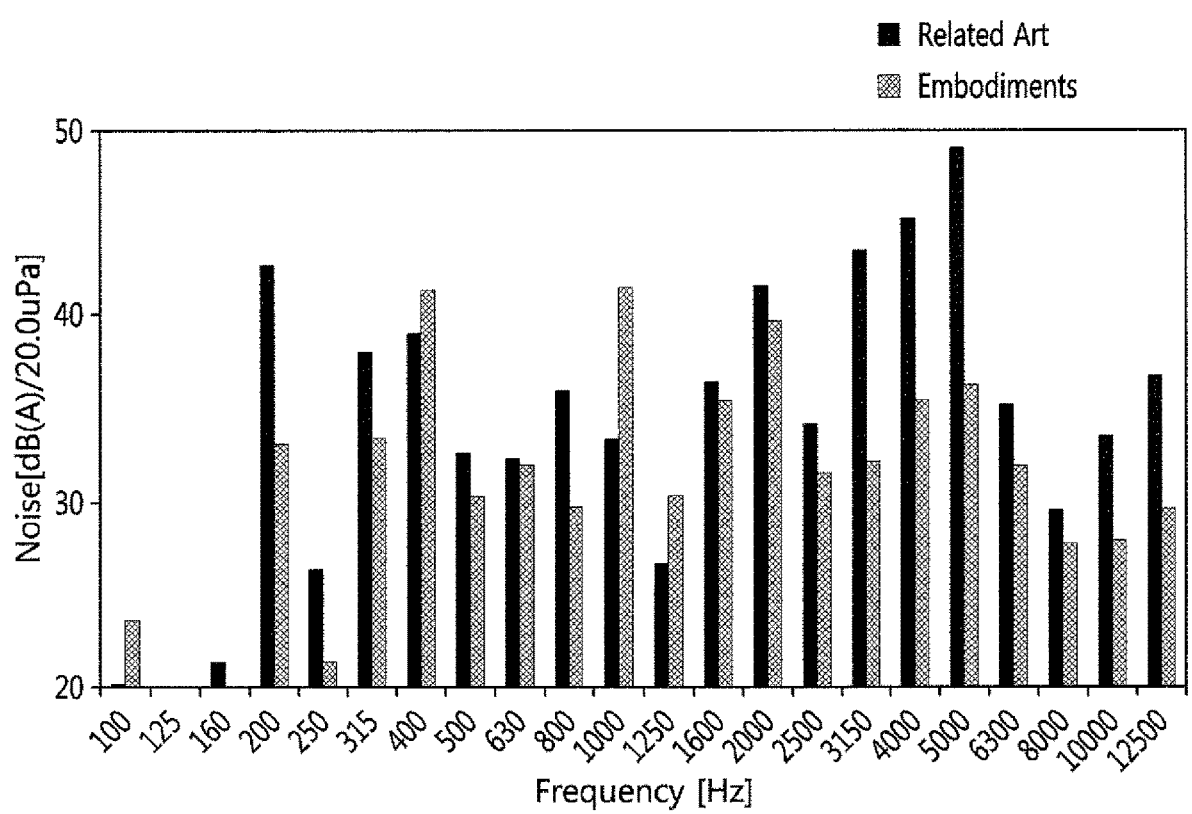
FIG. 8 is a graph illustrating a noise analysis result of the stator according to an embodiment.

FIG. 8 is a graph illustrating a noise analysis result of the stator according to an embodiment. Referring to FIG. 8, the graph that shows results obtained by analyzing noise generated in the stator according to embodiments and noise generated in the stator according to the related art.

In the stator according to embodiments, electromagnetic noise generated in a state in which the insulation part is disposed between one coil winding part and the other coil winding part, and a portion of the coils wound around the one coil winding part and the other coil winding part is surrounded by the insulation part is measured. Also, in the stator according to the related art, electromagnetic noise generated in a state in which the insulation film member having the thin film and the insulator are disposed between one coil winding part and the other coil winding part, and a portion of the coil is surrounded by the insulation film member is measured.

Referring to the graph, the electromagnetic noise generated in the stator according to embodiments may be reduced by efficiently attenuating vibration of the noise through the insulation part surrounding a portion of the coil. Thus, it may be confirmed that the electromagnetic noise generated in the stator according to embodiments is significantly reduced when compared to that generated in the stator according to the related art.

Embodiments provide a stator for a compressor motor, in which electromagnetic noise generated in a wound coil is capable of being reduced. Embodiments further provide a stator for a compressor motor, in which manufacturing costs of the stator is capable of being reduced.

In one embodiment, a stator for a compressor motor may include an insulation part or portion disposed between one or a first coil winding part or portion and the other or a second coil winding part or portion of a plurality of coil winding parts or portions and configured to surround a portion of a coil to reduce electromagnetic noise generated in the coil. The stator for a compressor motor may be made of a rubber-based material having heat resistance, chemical resistance, abrasion resistance, and durability or a plastic-based material having heat resistance, chemical resistance, abrasion resistance, and workability to suppress vibration of the electromagnetic noise generated in the coil, thereby reducing electromagnetic noise.

In the stator for the compressor motor according to embodiments, the insulation parts may extend in an axial direction of a stator body so as to be integrated with each other, or the insulation parts may be disposed to be spaced apart from each other in the axial direction of the stator body, thereby simplifying a process of providing the insulation part.

In the stator for the compressor motor according to embodiments, cost required for the process of providing the insulation part may be reduced in the process of manufacturing the stator, and the insulation part may be optimally disposed. The insulation part made of the plastic-based material or rubber-based material having heat resistance, chemical resistance, and abrasion resistance may be provided in the stator to reduce electromagnetic noise generated in the coil wound around the stator. The insulation part provided in the stator may be optimally disposed to reduce the cost required for the process of providing the insulation part.

The details of one or more embodiments are set forth in the accompanying drawings and the description below. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stator for a compressor motor, the stator comprising:
   a stator body having a hollow therein;
   a plurality of coil winding portions that protrudes inward from an inner circumferential surface of the stator body and spaced apart from each other, wherein each of the plurality of coil winding portions comprises a body that protrudes from the inner circumferential surface of the stator body, and an extension portion that extends from an end of the body at each of both sides of the body;
   a coil wound around each of the plurality of coil winding portions; and
   a plurality of insulation portions that extends in an axial direction of the stator body, disposed between a first coil winding portion and a second coil winding portion of the plurality of coil winding portions, and coupled to the inner circumferential surface of the stator body to surround a portion of the coil, wherein the plurality of insulation portions is made of polyether ether ketone, which is a plastic-based material, or one of polyurethane rubber or silicone rubber, which are rubber-based materials, wherein each of the plurality of insulation portions comprises a first insulation portion and a second insulation portion, which are disposed to be spaced apart from each other in the axial direction of the stator body, and wherein the first and second insulation portions of one of the plurality of insulation portions are spaced apart from the first and second insulation portions of the other of the plurality of insulation portions in a tangential direction of the stator body.

2. The stator according to claim 1, wherein, when the plurality of insulation portions is made of one of the polyurethane rubber or the silicone rubber and the plurality of insulation portions is provided in a liquid state, the plurality of insulation portions in the liquid state is applied to the inner circumferential surface of the stator body and then hardened to be fixed thereto.

3. The stator according to claim 1, wherein each of the plurality of insulation portions comprises:
   a protrusion portion that protrudes from at least one of an upper end or a lower end of the stator body; and
   a fixed portion disposed inside the stator body so as to be fixed to the stator body.

4. The stator according to claim 3, wherein a portion of the coil is disposed to contact the protrusion portion so as to be spaced apart from the at least one of the upper end or the lower end of the stator body.

5. The stator according to claim 3, wherein each of the plurality of insulation portions comprises:
   an insulation portion body coupled to the inner circumferential surface of the stator body;
   a first extension portion that extends from a first side of the insulation portion body toward the extension portion of the first coil winding portion and coupled to the body of the first coil winding portion; and
   a second extension portion that extends from a second side of the insulation portion body toward the extension portion of the second coil winding portion and coupled to the body of the second coil winding portion.

6. The stator according to claim 1, wherein each of the first and second insulation portions comprises:
   an insulation portion body coupled to the inner circumferential surface of the stator body;
   a first extension portion that extends from a first side of the insulation portion body and coupled to the body of the first coil winding portion; and
   a second extension portion that extends from a second side of the insulation portion body and coupled to the body of the second coil winding portion.

7. The stator according to claim 6, wherein the first insulation portion is disposed at an upper portion of the stator body, and the second insulation portion is disposed at a lower portion of the stator body.

8. The stator according to claim 7, wherein a plurality of each of the first insulation portion and the second insulation portion is provided, and wherein the stator further comprises:
   a first connection portion configured to connect first insulation portions, which are adjacent to each other, of the plurality of first insulation portions to each other; and
   a second connection portion configured to connect second insulation portions, which are adjacent to each other, of the plurality of second insulation portions to each other.

9. The stator according to claim 8, wherein the first connection portion connects a first extension portion of a first one of the plurality of first insulation portions to a second extension portion of a second one of the plurality of first insulation portions, and the second connection portion connects a first extension portion of a first one of the plurality of second insulation portions to a second extension portion of a second one of the plurality of second insulation portions.

10. The stator according to claim 8, wherein the plurality of first insulation portions is seated on a top surface of the stator body, and the plurality of second insulation portions is seated on a bottom surface of the stator body.

11. The stator according to claim 1, wherein an insertion space is provided between an extension portion of the first coil winding portion and an extension portion of the second coil winding portion adjacent to each other.

12. The stator according to claim 1, wherein the plurality of insulation portions has a predetermined thickness.

13. A stator for a compressor motor, the stator comprising:
   a cylindrical stator body;
   a plurality of coil winding portions that protrudes inward from an inner circumferential surface of the stator body and spaced apart from each other, wherein each of the plurality of coil winding portions comprises a body that protrudes from the inner circumferential surface of the stator body, and an extension portion that extends from an end of the body at each of both sides of the body;

a plurality of coils wound around the plurality of coil winding portions, respectively; and a plurality of insulation layers that extends in an axial direction of the stator body, the plurality of insulation layers being disposed between adjacent pairs of the plurality of coil winding portions and coupled to the inner circumferential surface of the stator body to surround a portion of the plurality of coils, respectively, wherein the plurality of insulation layers is made of polyether ether ketone, which is a plastic-based material, or one of polyurethane rubber or silicone rubber, which are rubber-based materials wherein each of the plurality of insulation layers comprises a first insulation layer and a second insulation layer, which are disposed to be spaced apart from each other in the axial direction of the stator body, and wherein the first and second insulation layers of one of the plurality of insulation layers are spaced apart from the first and second insulation layers of the other plurality of insulation layers in a tangential direction of the stator body.

14. The stator according to claim 13, wherein each of the plurality of insulation layers comprises:
   a protrusion portion that protrudes from at least one of an upper end or a lower end of the stator body; and
   a fixed portion disposed inside the stator body so as to be fixed to the stator body.

15. The stator according to claim 14, wherein each of the plurality of insulation layers further comprises:
   an insulation layer body coupled to the inner circumferential surface of the stator body;
   a first extension portion that extends from a first side of the insulation layer body toward the extension portion of a first coil winding portion of the adjacent pairs of the plurality of coil winding portions and coupled to the body of the first coil winding portion; and
   a second extension portion that extends from a second side of the insulation layer body toward the extension portion of a second coil winding portion of the adjacent pairs of the plurality of coil winding portions and coupled to the body of the second coil winding portion.

16. The stator according to claim 13, wherein each of the first and second insulation layers comprises:
   an insulation layer body coupled to the inner circumferential surface of the stator body;
   a first extension portion that extends from a first side of the insulation layer body and coupled to the body of a first coil winding portion of the adjacent pairs of the plurality of coil winding portions; and
   a second extension portion that extends from a second side of the insulation layer body and coupled to the body of a second coil winding portion of the adjacent pairs of the plurality of coil winding portions.

17. The stator according to claim 16, wherein the first insulation layer is disposed at an upper portion of the stator body, and the second insulation layer is disposed at a lower portion of the stator body.

18. The stator according to claim 17, wherein a plurality of each of the first insulation layer and the second insulation layer is provided, and wherein the stator further comprises:
   first connection portions configured to connect the plurality of first insulation layers, which are adjacent to each other, to each other; and
   second connection portions configured to connect the plurality of second insulation layers, which are adjacent to each other.

19. The stator according to claim 13, wherein a plurality of insertion spaces is provided between extension portions of the adjacent pairs of the plurality of coil winding portions, respectively.

20. The stator according to claim 13, wherein the plurality of insulation layers has a predetermined thickness.

* * * * *